(12) United States Patent
Holmgren et al.

(10) Patent No.: US 10,458,563 B2
(45) Date of Patent: Oct. 29, 2019

(54) VALVE ARRANGEMENT

(71) Applicant: IMI HYDRONIC ENGINEERING INTERNATIONAL SA, Eysins (CH)

(72) Inventors: Björn Holmgren, Ulricehamn (SE); Leif Marstorp, Ljung (SE); Andreas Jonsson, Ljung (SE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 146 days.

(21) Appl. No.: 15/309,838

(22) PCT Filed: Apr. 29, 2015

(86) PCT No.: PCT/EP2015/059325
§ 371 (c)(1),
(2) Date: Nov. 9, 2016

(87) PCT Pub. No.: WO2015/169662
PCT Pub. Date: Nov. 12, 2015

(65) Prior Publication Data
US 2017/0241559 A1    Aug. 24, 2017

(30) Foreign Application Priority Data
May 9, 2014    (EP) .................................. 14167639

(51) Int. Cl.
*F16K 27/02*    (2006.01)
*G05D 16/04*    (2006.01)
(Continued)

(52) U.S. Cl.
CPC .......... *F16K 27/02* (2013.01); *F16K 37/0091* (2013.01); *F24D 19/1015* (2013.01);
(Continued)

(58) Field of Classification Search
CPC . F24D 19/1015; F24D 19/1036; G01L 15/00; G01L 19/0015; G01L 19/0023;
(Continued)

(56) References Cited

U.S. PATENT DOCUMENTS 3,065,763 A * 11/1962 Howard ................ B60C 29/007
                                                        137/223
3,217,733 A * 11/1965 Howard ................ B60C 29/007
                                                        137/226
(Continued)

FOREIGN PATENT DOCUMENTS

| DE | 3236679 A1 | 4/1984 |
| DE | 20 2006 017 595 U1 | 2/2007 |
| WO | WO 2010/090572 A1 | 8/2010 |

OTHER PUBLICATIONS

International Search Report (PCT/ISA/210) dated Jul. 20, 2015, by the European Patent Office as the International Searching Authority for International Application No. PCT/EP2015/059325.
(Continued)

*Primary Examiner* — Mary E McManmon
*Assistant Examiner* — Richard K. Durden
(74) *Attorney, Agent, or Firm* — Buchanan Ingersoll & Rooney P.C.

(57) ABSTRACT

A valve arrangement including: a valve inlet, a valve outlet arranged downstream of the valve inlet, a first chamber arranged directly downstream of the inlet, and a second chamber arranged between the first chamber and the valve outlet. The valve arrangement further includes a measuring nipple comprising a measuring channel for receiving a measuring device, and a closing arrangement having open positions and a closed position, wherein the closing arrangement in its closed position is configured to prevent fluid communication between the first chamber and the second chamber via the closing arrangement, and wherein the
(Continued)

closing arrangement in its open positions is configured to allow for fluid communication between the first chamber and the second chamber via the closing arrangement.

12 Claims, 8 Drawing Sheets

(51) Int. Cl.
*F16K 37/00* (2006.01)
*G01L 19/00* (2006.01)
*G05D 16/06* (2006.01)
*G01L 15/00* (2006.01)
*F24D 19/10* (2006.01)

(52) U.S. Cl.
CPC .......... *F24D 19/1036* (2013.01); *G01L 15/00* (2013.01); *G01L 19/0023* (2013.01); *G05D 16/0402* (2019.01); *G05D 16/0655* (2013.01); *G01L 19/0038* (2013.01)

(58) Field of Classification Search
CPC .......... G01L 19/003; G01L 19/0038; G01L 19/0046
See application file for complete search history.

(56) References Cited

U.S. PATENT DOCUMENTS

| | | | | |
|---|---|---|---|---|
| 3,633,618 A * | 1/1972 | Blackmore | ......... | G01L 19/0015 137/557 |
| 3,762,432 A * | 10/1973 | Peterson, Jr. | .......... | F16L 55/00 137/317 |
| 3,787,028 A * | 1/1974 | Semon | .................... | F16K 5/185 251/317 |
| 3,797,317 A * | 3/1974 | Peterson, Jr. | .......... | F16L 55/10 137/317 |
| 4,461,173 A * | 7/1984 | Olin | .................... | G01F 1/6842 73/202.5 |
| 5,291,920 A * | 3/1994 | Glansk | .................... | F16K 27/02 137/560 |
| 5,566,711 A * | 10/1996 | Glansk | .................... | F16K 1/10 137/557 |
| 6,899,317 B2 * | 5/2005 | Brady | ................. | F16K 37/0066 137/557 |
| 7,055,547 B2 * | 6/2006 | Wang | ................. | F16K 37/0066 137/552 |
| 7,328,721 B2 * | 2/2008 | Kytola | .................... | F16K 11/22 137/599.13 |
| 2011/0240148 A1 | 10/2011 | Norlander | | |

OTHER PUBLICATIONS

Written Opinion (PCT/ISA/237) dated Jul. 20, 2015, by the European Patent Office as the International Searching Authority for International Application No. PCT/EP2015/059325.

* cited by examiner

VALVE ARRANGEMENT

TECHNICAL FIELD OF THE INVENTION

The present inventive concept relates to a valve arrangement comprising a measuring channel for receiving a measuring device. The inventive concept also relates to a fluid distribution system comprising such a valve arrangement.

BACKGROUND OF THE INVENTION

Fluid distribution systems, for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves are frequently used in fluid distribution systems and have a variable opening such that the flow rates can be controlled. Because a control valve may operate during varying system conditions, the control valve may be complemented with a differential pressure valve. An example of such a combined control valve part and differential pressure valve part is known from WO 2010/090572 A1. The differential pressure valve part limits the differential pressure over the control valve part. Therefore, the operating conditions for the control valve part may be maintained at an adequate level despite variations of the pressure level in the entire fluid distribution system.

When a valve is to be installed in a fluid distribution system, the person installing the valve normally measures the fluid pressure at the valve inlet, in order to correctly calibrate the valve. WO 2010/090572 discloses a flushing spindle which is opened in order to measure the pressure present at the valve inlet. Providing such a flushing spindle presumes certain dimensions of the valve, and it may be difficult to implement in smaller valve bodies.

It would be desirable to provide for a manner to measure the pressure present at a valve inlet, even in smaller valve bodies, regardless of such valve bodies having only one valve part, or two or more valve parts such as the differential pressure valve part and control valve part of WO 2010/090572.

SUMMARY OF THE INVENTION

An object of the present inventive concept is to alleviate the drawbacks of the prior art. In particular, an object of the present inventive concept is to provide for a concept which may be generally applicable to different types of valves and which enables measurement of inter alia the pressure present at the valve inlet. These and other objects, which will become apparent in the following, are accomplished by means of valve arrangement and a fluid distribution system as defined in the independent claims.

The present inventive concept is based on the insight that a measuring channel which has an opening downstream of a pressure drop in a valve may be provided with an additional opening upstream of said pressure drop in order to measure the pressure present at valve inlet.

In particular, the inventors have realized that a measuring channel extending into a second chamber which may be sealed off from a first chamber by means of a closing arrangement in the valve, such as a plug and seat, may additionally be provided with a direct passage to the first chamber.

Thus, according to a first aspect of the inventive concept, a valve arrangement is provided. The valve arrangement comprises:
a valve inlet,
a valve outlet arranged downstream of said valve inlet,
a first chamber arranged directly downstream of said inlet,
and a second chamber arranged between said first chamber and said valve outlet,
a measuring nipple comprising a measuring channel for receiving a measuring device,
a closing arrangement having open positions and a closed position, wherein said closing arrangement in its closed position is configured to prevent fluid communication between said first chamber and said second chamber via said closing arrangement, and wherein said closing arrangement in its open positions is configured to allow for fluid communication between said first and said second chamber via said closing arrangement,
a first passage arranged between said first chamber and said measuring channel without passing said second chamber, said first passage enabling measuring of fluid pressure in said first chamber, and
a second passage arranged between said second chamber and said measuring channel without passing said first chamber, said second passage enabling measuring of fluid pressure in said second chamber, wherein
said measuring nipple comprises said first passage and said second passage.

Thus, it should be understood that, in normal installation, said first passage is located upstream of said closing arrangement and said second passage is located downstream of said closing arrangement. Hereby, fluid pressure in said first chamber may be measured by using the same measuring nipple as when measuring fluid pressure in said second chamber. For example, when the closing arrangement is in its closed position, and no fluid flows through the valve arrangement, fluid in the first chamber represents the available pressure from the nearest upstream pressure source in the fluid distribution system.

According to at least one example embodiment, said closing arrangement in its closed position is configured to seal said first chamber from said second chamber, and said closing arrangement in its open positions is configured to allow for fluid communication between said first and said second chamber.

According to at least one exemplary embodiment, said first passage may be in the form of a duct or conduit extending between the measuring channel and the first chamber. The length of the first passage may be adapted to the location and extension of the measuring channel and the first chamber. In at least some example embodiments, the length of the first passage is greater than its diameter. Similarly, the second passage may be in the form of a duct or conduit extending between the measuring channel and the second chamber.

According to at least one exemplary embodiment, the first passage merely constitutes a hole through a wall that separates the measuring channel and the first chamber. In such case, the diameter of the first passage may be larger than the length of the first passage. Similarly, the second passage may constitute a hole through a wall that separates the measuring channel and the second chamber. The measuring channel can thus be regarded as comprising a first opening to the first chamber and a second opening to said second chamber. It should be understood that the measuring nipple may be considered as an arrangement comprising the features/components/functions for allowing a measuring device to measure fluid pressure inside the measuring channel. Hence, the first passage, being a conduit or merely a hole through the wall, and the second passage, being a conduit or merely a hole through the wall, is here defined as being a part of the measuring nipple, as compared to other valves where the first and second passages could be omitted if no measuring of fluid properties, such as e.g. fluid pressure, is needed.

In more general terms, the inventive concept provides for an opening in the measuring channel which may receive fluid medium from the first chamber without passing the second chamber. Hereby the opening may provide for pressurized communication between the measuring channel and the first chamber, without necessarily providing for pressurized communication between the measuring channel and the second chamber.

As indicated above, in some embodiments, said opening (constituting a passage in itself) may lead substantially directly into the first chamber, while in other embodiments the opening of the measuring channel is separated from the first chamber by a small conduit.

Apart from said first opening, the measuring channel may comprise a second opening which opens to said second chamber, to enable fluid to enter the measuring channel through said second opening for measurement of the pressure in said second chamber.

According to at least some exemplary embodiments, the first opening has a cross section or diameter which is smaller than the cross section (diameter) of the second opening. According to at least some exemplary embodiments, the first opening has a cross section or diameter which is larger than the cross section (diameter) of the second opening. According to at least some exemplary embodiments, the first opening has a cross section or diameter which is the same, or essentially the same, as the cross section (diameter) of the second opening.

Since, according to the first aspect, the first chamber is arranged directly downstream of the valve inlet, the pressure in the first chamber will be substantially equal to the pressure at the valve inlet. In at least some embodiments the valve inlet may also be a first chamber inlet. According to at least one example embodiment, said first chamber comprises sub-chambers, or conduits, arranged between the valve inlet and the closing arrangement.

In at least some embodiments, the second chamber is arranged directly upstream of the valve outlet. For instance, in some embodiments, the valve outlet may be a second chamber outlet. In at least some embodiments, there is provided at least a third chamber between the second chamber and the valve outlet. In some embodiments the fluid communication between the second and the third chamber may be sealed off by a closing arrangement, such as a plug and mating seat.

Different types of closing arrangements may be used for sealing off the first chamber from the second chamber. In at least some exemplary embodiments, said closing arrangement comprises a closing member, such as e.g. a plug, which is adapted to mate with a seat, and wherein, in said closed position, said closing member seals against said seat. For example, said closing member may be arrange to seals said first chamber from said second chamber by sealing against said seat. In some embodiments said plug has a through hole allowing fluid to flow there through. Thus, according to at least one example embodiment, said closing member comprises a closing member body having a through hole for, in said open positions, allow for fluid communication between said first chamber to said second chamber. For instance, in some embodiments, fluid is allowed to flow from the first chamber through the closing member or plug and into the second chamber, provided that the closing member or plug has not sealed against the seat (i.e. provided that the closing arrangement is in an open position). In other words, said through hole of the closing member comprises an inlet in fluid communication with said first chamber, and an outlet which in said open positions is in fluid communication with said second chamber. In said closed position, said closing member body, i.e. a part of the plug, seals against said seat such that said outlet of said through hole is sealed from said second chamber. In other embodiments said plug is solid without a through passage, wherein fluid flows on the side or around the plug. In at least some embodiments, the plug (with or without a through hole) is located upstream of the seat. In other embodiments, the plug is located downstream of the seat.

According to at least one example embodiment, said closing member has a circular cross section. Other types of closing arrangements may comprise rotary valves, sliding valves etc.

As mentioned above, the closing arrangement has open positions and closed positions. In the closed position no fluid is allowed to flow from the first chamber via the closing arrangement and into the second chamber. In the open positions, fluid is allowed to flow there through. In other words, in the closed position the fluid is prevented to flow from the first chamber via the closing arrangement and into the second chamber, i.e. there is no fluid communication between the first chamber and the second chamber via the closing arrangement.

According to at least one example embodiment, in the closed position the closing arrangement is arranged to prevent fluid communication between the first chamber and the second chamber via the closing arrangement, wherein a by-pass channel from the first chamber to the second chamber allows for a fluid communication between the first chamber and the second chamber.

According to at least one example embodiment, an orifice is arranged between said first chamber and said second chamber, wherein said orifice is providing for a fluid communication (e.g. a flow path, such as e.g. a main flow path) between said first chamber and said second chamber, and wherein said closing arrangement is arranged to control fluid flow through said orifice such that when the closing arrangement is in its open position, there is a fluid communication between the first chamber and the second chamber via said orifice, and when the closing arrangement is in its closed position, the fluid communication between the first chamber and the second chamber via said orifice is prevented.

Said orifice may e.g. be an opening, such as e.g. an annular opening, provided in the valve arrangement between the first chamber and the second chamber, or said orifice may be an opening from the through-hole of said closing member plug into the second chamber.

According to at least one example embodiment, said closing arrangement is arranged to seal said orifice when the closing arrangement is in its closed position.

As mentioned above, said closing arrangement may comprise a closing member, such as e.g. a plug or a closing member with a through hole, which is adapted to mate with a seat. Said seat may e.g. be comprised in the walls defining said orifice, or e.g. be comprised in said second chamber. Said orifice may e.g. be defined by the walls of seat or e.g. be defined by an edge of the closing member body surrounding the through-hole and facing the second chamber. Thus, in the closed position of said closing arrangement, said closing member is arranged to prevent fluid communication through said orifice by said closing member being arranged to seal against said seat.

Suitably, the valve closing arrangement may have a position in which it is considered as fully open, i.e. providing for a largest defined opening area through the closing arrangement. The opening degree of the valve closing arrangement is suitable controlled in a stepless manner. However, in some embodiments, the opening degree may be discretely controlled, in steps between the closed position and the fully opened position.

There are various conceivable ways of closing the first and/or the second passages. In at least some embodiments the first passage and/or the second passage is closed where it emanates into the measuring channel. Thus, the first passage and/or the second passage may have an opening into the measuring channel which may be sealed off. This may for instance be accomplished by one or more movable occlusive element portions. Opening and closing at least one of the passages may in some embodiments be accomplished by rotating a movable element, and in other embodiments by displacing it in the axial direction of the measuring channel, i.e. by having a movable occlusive element portion comprised in the measuring nipple body, and where the measuring nipple body is movable relative to a valve body of the valve arrangement. The movable occlusive element portion may also be formed as a hollow cylinder (for e.g. opening and closing the first passage) or as a cone (for e.g. opening and closing the second passage) and be arranged inside the measuring channel. In at least some exemplary embodiments the first passage may be closed where it emanates into the first chamber, and the second passage may be closed where it emanates into the second chamber. According to at least one example embodiment, at least one of said openings is an occlusive opening, i.e. an opening which may be closed and opened. According to at least one example embodiment, at least one of the first and the second passages is a closable passage, i.e. a passage which may be closed and opened.

Thus, according to at least one exemplary embodiment, said measuring nipple comprises a movable occlusive element portion said movable occlusive element portion being configured to close and open at least one of said passages between said first chamber and said measuring channel, and between said second chamber and said measuring channel, respectively. The movable occlusive element portion may suitably be a part of the measuring nipple body, or the surrounding walls of the measuring channel. If the movable occlusive element portion is part of the measuring nipple body, or the surrounding walls of the measuring channel (i.e. if the movable occlusive element is the measuring nipple body, or the surrounding walls of the measuring channel, respectively), the first and/or the second passage may be closed by moving the measuring nipple body, or the surrounding walls of the measuring channel relative to a valve body of the valve arrangement such that a portion of the movable occlusive element, i.e. the movable occlusive element portion, closes the first and/or the second passage. In the embodiment where the movable occlusive element portion is arranged inside the measuring channel (i.e. if the movable occlusive element is an element arranged inside the measuring channel), it may preferable be adapted to the shape of the measuring channel, e.g. be formed to have an annular shape; however, other shapes are conceivable as long as it functions to close and open the first and/or the second passage.

It should be understood that said movable occlusive element portion is temporarily occlusive, and may close and open said first and/or said second passage temporarily.

According to at least one example embodiment, said movable occlusive element portion is arranged not to close the second passage, i.e. not to prevent the pressurized communication with the second chamber, i.e. to allow for an uninterrupted pressurized communication between the second chamber and the measuring channel. For example, the movable occlusive element portion may be portion/part of the measuring nipple body, or the surrounding walls of the measuring channel, or, if the movable occlusive element portion is arranged inside the measuring channel, it may be hollow, e.g. a hollow cylinder. According to at least one example embodiment, the movable occlusive element portion is formed as a hollow cylinder or is ring-shaped. According to at least one example embodiment, the movable occlusive element portion is a part of the measuring nipple body, or the surrounding walls of the measuring channel. According to at least one example embodiment, the first passage between the measuring channel and the first chamber may be closed or open depending on the position of the movable occlusive element portion. For example, if the movable occlusive element portion is formed as a portion/part of the measuring nipple body, or the surrounding walls of the measuring channel, the first passage may be closed if the movable occlusive element portion is arranged such that it covers the first passage. The first passage may then be opened by moving the movable occlusive element portion away from the first passage. In some operating conditions of the valve arrangement, e.g. when fluid pressure inside the second chamber is to measured, the movable occlusive element portion may fully cover the first passage. In some operating conditions of the valve arrangement, e.g. when fluid pressure inside the first chamber is to measured, the movable occlusive element portion may be distant from the first passage. In some operating conditions of the valve arrangement, the movable occlusive element portion may cover, but not fully cover, the first passage, i.e. some fluid from the first chamber is allowed to be led to the second chamber via the measuring channel.

According to at least one example embodiment, said movable occlusive element portion is configured to close and open the second passage between the second chamber and the measuring channel, i.e. to prevent and establish the pressurized communication between the measuring channel and the second chamber, respectively. For example, the movable occlusive element portion may function as a plug and e.g. be formed as a cone, and seal against the second passage, which may function as a seat. According to at least one example embodiment, said movable occlusive element portion is configured to selectively allow for a pressurized communication between the measuring channel and the first or second chamber, respectively. In other words, the movable occlusive element portion provides for a pressurized communication between the measuring channel and the second chamber, while providing for no pressurized communication between the measuring channel and the first chamber, and vice versa. That is, the first and the second passages are opened and closed selectively. According to at least one example embodiment, said measuring nipple comprises two movable occlusive element portion, a first movable occlusive element portion being configured to open and close the first passage, e.g. by that said first movable occlusive element portion is a part of the measuring nipple body or the walls surrounding the measuring channel, and a second movable occlusive element portion being arranged inside the measuring channel and being formed as a plug to close and open the second passage.

If the first and the second passages are both opened to the measuring channel such that both the first and the second passages are in fluid communication with the measuring channel and each other, a by-pass of the closing arrangement is provided for. However, the first passage may also be sealed from the second passage, and hence no by-pass is provided for.

According to at least one exemplary embodiment, said measuring nipple comprises a sealing element, said sealing element having a sealable through hole for allowing a measuring device, such as e.g. a measuring probe, to be guided through said through hole into said measuring channel, and wherein said sealable through hole is configured to seal said measuring channel when no measuring device is guided through said sealable through-hole. Thus, the sealing element may provide for a seal between a top space of the measuring nipple, or an outside of the measuring nipple, i.e. the surroundings, and the measuring channel, while at the same time allows for a measuring device to access the measuring channel and measure e.g. the pressure of the fluid inside the measuring channel. According to at least one example embodiment, said measuring device is a measuring device for measuring fluid pressure, e.g. a pressure measuring probe.

According to at least one example embodiment, said sealing element comprises a resilient material, such as rubber. Hereby, the material of the sealing element facilitates for the measuring device to penetrate the sealing element as the sealable through hole may be widened as a result of the resilient feature of the sealing element. In other words, the sealable through hole functions similar to when a syringe penetrates a rubber plug to get access to some medicament. Furthermore, the material of the sealing element allows for the sealable function of the sealable through hole, as the resilient feature of the sealing element may seal the through hole when no measuring device is used. The sealable through hole may be constructed by pre-drilling the sealing element with a small drill or needle.

According to at least one example embodiment, said sealing element is movable and may be moved inside the measuring nipple. According to at least one example embodiment, said sealing element is locked in place by a locking element, such as e.g. a metal ring, arranged inside the measuring channel. Thus, according to at least one example embodiment, said sealing element is locked in position inside the measuring nipple. According to at least one example embodiment, said movable occlusive element portion is arranged closer to the second chamber compared to the sealing element. According to at least one example embodiment, said sealing element is connected to the movable occlusive element portion.

According to at least one example embodiment, said sealing element is a first sealing element, and said measuring nipple comprises a second sealing element, said first and said second sealing elements being arranged to separate said measuring channel into a first measuring channel portion and a second measuring channel portion, said first measuring channel portion being sealed from an outside of the measuring nipple by the first sealing element, and sealed from the second measuring channel portion by the second sealing element.

Hence, said second sealing element is arranged inside said measuring channel between said first and said second passages. Hereby, the first measuring channel portion is arranged in pressurized communication with the first passage, and the second measuring channel portion is arranged in pressurized communication with the second passage.

According to at least one example embodiment, said second sealing element comprises a sealable through hole for allowing a measuring device, such as e.g. a measuring probe, to be guided through said through hole into said second measuring channel portion, and wherein said sealable through hole is configured to seal said first measuring channel portion from said second measuring channel portion when no measuring device is guided through said sealable through-hole.

Hereby, a measuring device, such as a measuring probe, may be inserted into the first measuring channel portion by penetrating said through hole of said first sealing member. Thus, fluid characteristics such as fluid pressure, of fluid inside said first chamber may be measured as the first measuring channel portion is in pressurized communication and/or fluid communication with said first chamber via said first passage. If the measuring probe is further guided through the measuring channel and is allowed to penetrate said through hole of said second sealing member and further into said second measuring channel portion, fluid characteristics such as e.g. fluid pressure of fluid inside said second chamber may be measure as the second measuring channel portion is in pressurized communication and/or fluid communication with said second chamber via said second passage. Thus, the sealing elements need not to be movable within the measuring nipple as the sealable through holes provides for the possibility of the measuring device to be in fluid communication and/or a pressurized communication with each chamber separately. Thus, moving parts within the measuring nipple may be omitted.

It should be understood that a pressurized communication between two locations within the valve arrangement normally entails a fluid communication between the locations. However, if it is desirable to avoid contact between the measuring device and fluid within the first or the second chamber, e.g. if the fluid inside these chambers is contaminated (e.g. radioactive), a membrane may fluidly separate the first and the second chambers from the measuring channel, while still providing for a pressurized communication between the measuring channel and the first and/or second chamber. According to at least one example embodiment, a fluid connection is arranged from the measuring channel to a measuring valve/metering valve, wherein inside said measuring valve/metering valve a membrane is arranged to separate the fluid from the measuring channel from a different fluid, e.g. a silicon based fluid, such as oil. The pressure of the silicon based fluid thus represents the pressure of the fluid from the measuring channel, and a measuring probe may be used to measure the pressure without being in fluid contact with fluid from the measuring channel. If, on the other hand, some property of the fluid, such as e.g. the identification or occurrence of substances in the fluid, is to be measured, a fluid communication between the measuring channel/the measuring device and the first and/or second chamber is needed.

According to at least one example embodiment, said valve arrangement comprises a membrane and a membrane support connected to, and movable with said closing arrangement, said membrane having a first membrane side and a second membrane side arranged on an opposite side to said first membrane side, said first membrane side being configured to be in fluid communication with said second chamber for applying a first pressure to said membrane, resulting in a first force which is the product of the first pressure and the area of the first membrane side subjected to said first pressure, said second membrane side being configured to be in fluid communication with said outlet for applying a second pressure to said membrane, resulting in a second force which is the product of the second pressure and the area of the second membrane side subjected to said second pressure, wherein a difference between said first and second forces controls the movement of said membrane and said membrane support together with said closing arrangement.

According to at least one example embodiment, said membrane and said membrane support is connected to, and movable with said closing member.

Said first and second forces act at least partly in opposite directions. Said first force may e.g. act in a direction to close said closing member (via for example said membrane and said membrane support) and said second force may act in a direction to open said closing member (via for example said membrane and said membrane support).

According to at least one example embodiment, said valve arrangement comprises a spring element arranged to exert a third force on at least a part of said membrane support, wherein a direction of said third force is at least partly the same as a direction of said second force.

That is, the spring exerting a force on said membrane support, and fluid exerting a pressure on said second membrane side resulting in the second force, act in common to e.g. open said valve arrangement, while fluid exerting a pressure on said first membrane side resulting in the first force act to e.g. close said valve arrangement. The forces may also be balanced in such a way that the position of the closing arrangement is maintained.

According to at least one example embodiment, said closing member is connected to said membrane support by means of at least one connecting element, and wherein said seat is arranged between the membrane support and said closing member. The at least one connecting element may e.g. be formed as a leg connecting said closing member with said membrane support. Hereby, a space between an end of the closing member and the membrane support is provided for, where e.g. said seat may be arranged. By arranging the at least one connecting element as a leg, fluid is allowed to flow around said leg and further towards said valve outlet when said valve arrangement is in an open position.

According to at least one example embodiment, said closing arrangement is a first closing arrangement, said seat is a first seat, and said closing member is a first closing member, and said valve arrangement further comprises:

a third chamber arranged between said second chamber and said valve outlet, said third chamber being arranged directly upstream of said valve outlet, a second closing arrangement having a second seat and a second closing member, said second closing member being configured to prevent fluid communication between said second chamber and said third chamber via said second closing arrangement by sealing against said second seat in a closed position, and being arranged to allow for a fluid communication between said second and said third chamber in open positions via said second closing arrangement.

According to at least one example embodiment, said second closing member is configured to seal said second chamber from said third chamber by sealing against said second seat in a closed position, and is arranged to allow for a fluid communication between said second and said third chamber in open positions.

Said second closing arrangement may be arranged in different ways. In at least some exemplary embodiments, said second closing arrangement comprises a second closing member, such as e.g. a second plug, which is adapted to mate with a second seat, and wherein, in said closed position, said second closing member seals said second chamber from said third chamber by sealing against said second seat. In some embodiments said second plug has a through hole allowing fluid to flow there through. For instance, in some embodiments, fluid is allowed to flow from the second chamber through the second plug and into the third chamber, provided that the second plug has not sealed against the second seat (i.e. provided that the second closing arrangement is in an open position). In other embodiments said second plug is solid without a through passage, wherein fluid flows on the side or around the second plug. In at least some embodiments, the second plug (with or without a through hole) is located upstream of the second seat. In other embodiments, the second plug is located downstream of the second seat.

According to at least one example embodiment, said third chamber is in pressurized communication with said second side of said membrane. Hence, fluid from said third chamber may act on said first closing member, via said membrane and said membrane support, in the same direction as the force from the spring, to e.g. open said first closing arrangement.

According to at least one example embodiment, said first closing arrangement is a differential pressure valve part, and said second closing arrangement is a control valve part. Hereby, the differential pressure valve part limits the differential pressure over the control valve part. That is, the differential pressure valve part controls the differential pressure, and the control valve part controls the fluid flow. Therefore, the operating conditions for the control valve part may be maintained at an adequate level despite variations of the pressure level in the entire fluid distribution system.

According to at least one example embodiment, said measuring nipple is a first measuring nipple, and said valve arrangement further comprises a second measuring nipple arranged to measure fluid properties of fluid in said third chamber. For example, said second measuring nipple may be arranged similar to said first measuring nipple, but be in fluid communication and/or a pressurized communication with said third chamber, via e.g. a third passage.

Hereby, the differential pressure over the first and/or the second chambers, and the third chamber may be measured by connecting the two measuring nipples to a measuring device, such as e.g. a measuring probe or a measuring valve/metering valve measuring differential pressure. For example, if the second closing arrangement is closed, and the first closing arrangement is closed subsequently, the available pressure from the nearest upstream pressure source may be measure by the differential pressure between the fluid pressure in the first chamber (via the first measuring nipple) and fluid pressure in the third chamber (via the second measuring nipple), Here, the first passage is open and the pressure inside the first chamber and the second chamber is essentially the same. However, for this measurement, the second closing arrangement may have to be closed manually, or be securely closed, in order to avoid the second closing arrangement to open due to the increased pressure in the second chamber.

If the differential pressure between the second and third chamber is sought, e.g. during fluid flow through the valve arrangement, the first passage is preferably closed.

According to at least a second aspect of the present inventive concept, a fluid distribution system is provided for. The fluid distribution system comprises a valve arrangement according to the first aspect of the present inventive concept, a first fluid conduit for guiding fluid to said valve inlet, and a second fluid conduit for guiding fluid away from said valve outlet, wherein when said first closing arrangement is open to allow for a fluid communication between said first and second chamber, and said second closing arrangement is open to allow for a fluid communication between said second chamber and said third chamber, a fluid pressure in said first chamber is higher than a fluid pressure in said second chamber, and a fluid pressure in said second chamber is higher than a fluid pressure in said third chamber.

In other words, if a fluid pressure in the first chamber is denoted P1, a fluid pressure in the second chamber is denoted P2, and a fluid pressure in the third chamber is denoted P3; When there is fluid flow through the valve arrangement, P1 is larger than P2 and P2 is larger than P3. Thus, when fluid is flowing through the valve, fluid is throttled from P1 to P2 over the first closing arrangement, and is throttled from P2 to P3 over the second closing arrangement.

For example, if the second closing arrangement begins to close due to e.g. a reduced heating/cooling/flow demand, P2 will increase as a result of the increased flow obstruction caused by the second closing arrangement. Thus, fluid in the second chamber, at P2, will act on the first membrane side providing for a first force to close the first closing arrangement. Hence, if the second closing arrangement is closed, the first closing arrangement will be closed subsequently. Hereby, some fluid may be trapped in the second chamber at a pressure P2 between P1 and P3 if the first and third chambers are sealed from the second chamber. If the first passage between the first chamber and the measuring channel is opened, e.g. if the available pressure from the nearest upstream pressure source is to measured, fluid in the first chamber may be brought into a pressurized communication with the second chamber, provided that the second passage is opened. Hereby, the first force acting in a direction to close the first closing arrangement will be increased even more as pressure P2 is risen to that of P1. In other words, the fluid pressure inside the first chamber, P1, will be the same, or substantially the same as the fluid pressure inside the second chamber P2. If on the other hand, fluid pressure inside the second chamber is sought, the first passage is preferably closed.

When the first and the second passages are opened and in fluid communication with each other, i.e. fluid in the first chamber is in fluid and pressurized communication with the measuring channel, and there is no flow through the valve arrangement, the available pressure from the nearest upstream pressure source (e.g. a pump) may be measured in the measuring channel by e.g. a measuring device. For example, the differential pressure between the first chamber (or second chamber) and the third chamber may be measured by the first and second measuring nipples. For example, if the static pressure in the fluid distribution system in the vicinity of the valve arrangement is 5 bars, and the available pressure from the nearest upstream pressure source is 0.1 bar, the first measuring nipple will receive a fluid pressure of 5.1 bar (from the first chamber), and the second measuring nipple a fluid pressure of 5 bar (from the third chamber). Hence a differential pressure measurement will result in 5.1−5=0.1 bar, which is equal to the available pressure from the nearest upstream pressure source.

BRIEF DESCRIPTION OF THE DRAWINGS

The present inventive concept will now be described in more detail, with reference to the appended drawings showing example embodiments, wherein:

FIG. 3b illustrates in cross section the valve arrangement of FIG. 3a;

DETAILED DESCRIPTION OF THE DRAWINGS

In the following description, the present inventive concept is described with reference to a valve arrangement and a fluid distribution system comprising such valve arrangement.

Figure 1:
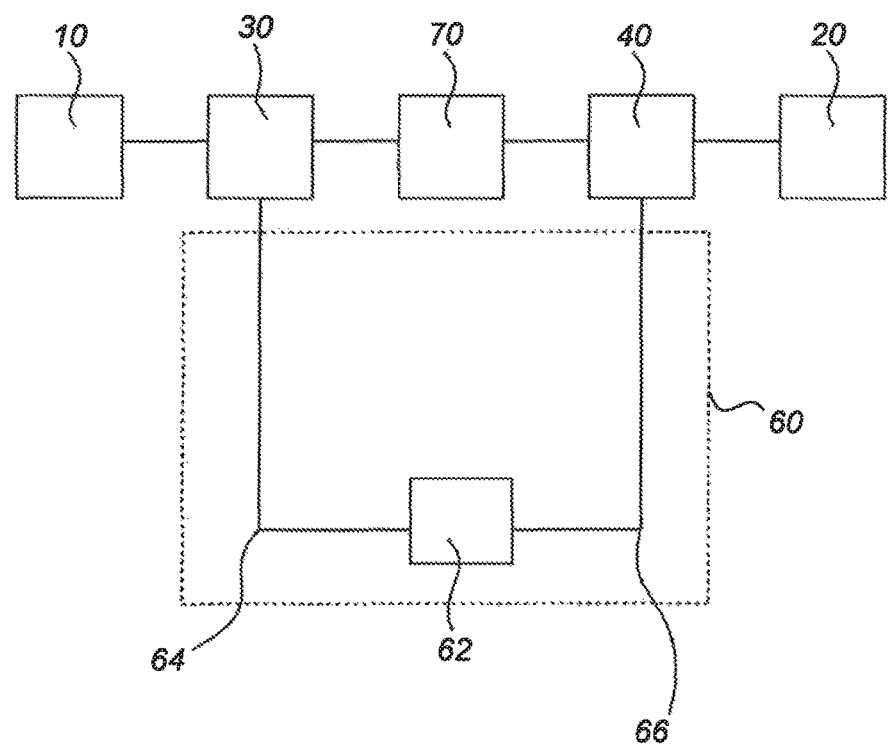
FIG. 1 is a schematic drawing showing the general principles of the inventive concept.

FIG. 1 illustrates a schematic drawing a valve arrangement 1. The valve arrangement comprises a valve inlet 10, a valve outlet 20 arranged downstream of the valve inlet 10, a first chamber 30 arranged downstream of the inlet 10, and a second chamber 40 arranged between the first chamber 30 and the valve outlet 20. The valve arrangement 1 further comprises a measuring nipple 60 having a measuring channel 62 for receiving a measuring device (not shown), such as e.g. a measuring probe, and a closing arrangement 70 arranged between the first chamber 30 and the second chamber 40. Thus, if the closing arrangement 70 is opened and there is no flow restriction at, or downstream of, the valve outlet 20, fluid may flow from the valve inlet 10 to the valve outlet 20 via the first chamber 30, the closing arrangement 70 and the second chamber 40.

As illustrated in FIG. 1, a first passage 64 is arranged between the first chamber 30 and the measuring channel 62, and a second passage 66 is arranged between the second chamber 40 and the measuring channel 62. The first passage 64 may be a constantly open passage 64, a closable passage 64 and/or be sealed from the second passage 66 by a sealing element in the measuring channel 62. The second passage 66 may be a constantly open passage 66, a closable passage 66 and/or be sealed from the first passage 64 by a sealing element in the measuring channel 62.

The functioning of the valve arrangement 1 will now be described in further detail with reference to FIG. 1. The closing arrangement 70 is arranged to have open positions and a closed position. In the closed position the first chamber 30 is sealed from the second chamber 40 and in any of the open positions, the closing arrangement 70 is configured to allow for fluid communication between the first chamber 30 and the second chamber 40.

According to at least one example embodiment, if the closing arrangement 70 is in its closed position, and the first and the second passages 64, 66 is in fluid communication with each other via the measuring channel 62, a by-pass of the closing arrangement 70 is provided for. If the fluid at, or downstream of, the valve outlet 20 is restricted (by e.g. another valve or another valve part as e.g. shown in FIGS. 3a-b) such that no fluid is allowed to flow through the valve arrangement 1, fluid pressure in the first chamber 30 and fluid pressure in the second chamber 40 will be essentially the same, or the same, as the by-pass provides for a pressurized communication between the first and the second chambers 30, 40. Hereby, fluid pressure in the first chamber 30, which comprise the available pressure from the nearest upstream pressure source, may be measured in the measuring channel 62 by the measuring device. Such configuration of the valve arrangement is further described with reference to FIG. 2.

By having at least one of the first and the second passages 64, 66 to be closable, and or seal the first passage 64 from the second passage 66 by a sealing element in the measuring channel 62, more varied ways to measure fluid pressure in the first chamber 30, fluid pressure in the second chamber 40, and/or a pressure difference between the first and second chambers 30, 40, are possible. This may be preferred if, for example, the closing arrangement 70 is in any of its open positions, and/or if there is a fluid flow through the valve arrangement 1. Such configurations of the valve arrangement are further described with reference to FIGS. 3-4.

Figure 2:
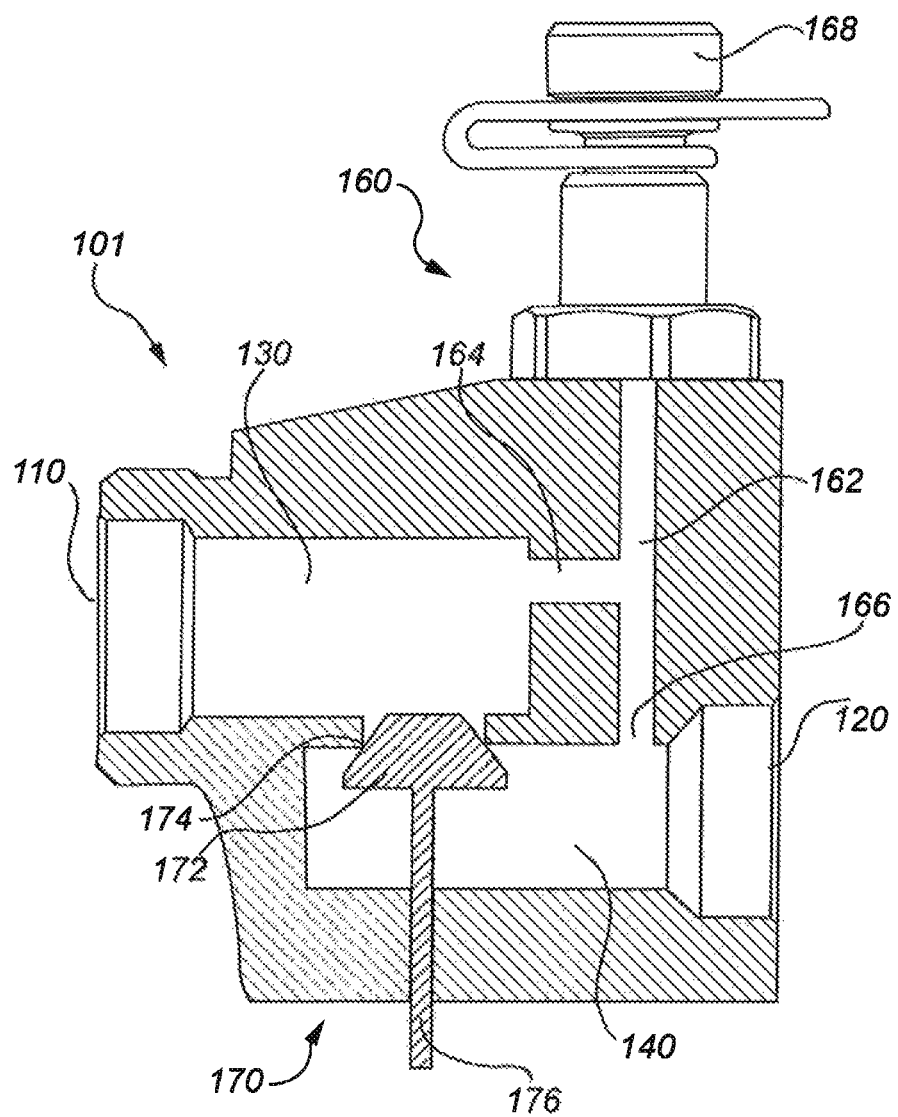
FIG. 2 illustrates in cross section a valve arrangement according to at least one example embodiment of the inventive concept.

FIG. 2 illustrates in cross section a valve arrangement 101. The valve arrangement comprises a valve inlet 110, a valve outlet 120 arranged downstream of the valve inlet 110, a first chamber 130 arranged directly downstream of the inlet 110, and a second chamber 140 arranged between the first chamber 130 and the valve outlet 120. The valve arrangement 101 further comprises a measuring nipple 160 having a measuring channel 162 for receiving a measuring device (not shown), such as e.g. a measuring probe, and a closing arrangement 170 arranged between the first chamber 130 and the second chamber 140.

As illustrated in FIG. 2, a first passage 164 is arranged between the first chamber 130 and the measuring channel 162, and a second passage 166 is arranged between the second chamber 140 and the measuring channel 162. The first passage 164 is in the form a conduit 164 extending from the first chamber 130 to the measuring channel 162. The second passage 166 is in the form of an opening 166 between the second chamber 140 and the measuring channel 162.

In FIG. 2, the measuring nipple 160 comprises a cap 168 which may be removed or penetrated in order to access the measuring channel 162. As illustrated in FIG. 2, the measuring nipple 160 may be considered as the arrangement 160 comprising the features/components/functions allowing for fluid inside the measuring channel to be measured, that is inter alia, the measuring channel 162, the first passage 164, and the second passage 166.

The closing arrangement 170 may be constructed in various ways. In FIG. 2, a plug 172 is arranged to mate with a seat 174. The plug 172 is attached to a rod 176 for moving the closing arrangement 170 from a closed position to open positions. In FIG. 2, the seat 174 is part of the walls partly defining the second chamber 140, and the majority of the plug 172 and the rod 176 are arranged in the second chamber 140. However, the closing arrangement 170 may also be arranged in the first chamber 130 such that the seat 174 is part of the walls partly defining the first chamber 130, and the majority of the plug 172 and the rod 176 are arranged in the first chamber 130.

An orifice is arranged between the first chamber 130 and the second chamber 140, wherein the orifice is providing for a fluid communication (e.g. a flow path, such as e.g. a main flow path) between the first chamber 130 and the second chamber 140. That is, the seat 174 is comprised in the walls defining the orifice. The closing arrangement 170 is arranged to control fluid flow through the orifice such that when the closing arrangement 170 is in its open position, there is a fluid communication between the first chamber 130 and the second chamber 140 via the orifice. When the closing arrangement 170 is in its closed position, the fluid communication between the first chamber 130 and the second chamber 140 via the orifice is prevented. In other words, the closing arrangement 170 is arranged to seal the orifice when the closing arrangement 170 is in its closed position Thus, in this example embodiment the orifice is an opening provided in the valve arrangement between the first chamber 130 and the second chamber 140.

The functioning of the valve arrangement 101 will now be described in further detail with reference to FIG. 2. The closing arrangement 170 is arranged to have open positions and a closed position. In FIG. 2, the closed position is illustrated, where the plug 172 mates with the seat 174 to seal the first chamber 130 from the second chamber 140. In any of the open positions, the closing arrangement 170 is configured to allow for fluid communication between the first chamber 130 and the second chamber 140. That is, the plug 172 will be distant from the seat 174 to allow for fluid to flow pass the plug 172 and the seat 174.

As shown in FIG. 2, the first passage 164 is arranged between, and in fluid communication with, the first chamber 130 and the measuring channel 162 without passing the second chamber 140. Hence, measuring of fluid pressure in the first chamber 130 via the first passage 164 and the measuring channel 162 may be carried out by a measuring device.

The second passage 166 is arranged between, and in fluid communication with, the second chamber 140 and the measuring channel 162 without passing the first chamber 130. Hence, measuring of fluid pressure in the second chamber 140 via the second passage 166 and the measuring channel 162 may be carried out by a measuring device.

As illustrated in FIG. 2, when the closing arrangement 170 is in its closed position, and the first and the second passages 164, 166 of the measuring nipple 160 is in fluid communication with each other via the measuring channel 162, a by-pass of the closing arrangement 170 is provided for. If the fluid at, or downstream of, the valve outlet 120 is restricted (by e.g. another valve or another valve part as e.g. shown in FIGS. 3a-b) such that no fluid is allowed to flow through the valve arrangement 101, fluid pressure in the first chamber 130 and fluid pressure in the second chamber 140 will be essentially the same, or the same, as the by-pass provides for a pressurized communication between the first and the second chambers 130, 140. Hereby, fluid pressure in the first chamber 130, which comprises the available pressure from the nearest upstream pressure source, may be measured in the measuring channel 162 by a measuring device.

With reference to FIG. 2, it has been described that the measuring channel 162 is in fluid communication with the first and/or the second chambers 130, 140 to allow for the measuring device to measure fluid pressure inside the measuring channel 162. However, the measuring channel 162 may e.g. comprise membranes (not shown) to fluidly separate the measuring channel 162 from the first and/or the second chambers 130, 140 while still providing for a pressurized communication between the measuring channel 162 and the first and/or the second chambers 130, 140, and thereby allow for the measuring device to measure fluid pressure inside the measuring channel 162 without a fluid communication between the measuring device and the first and/or the second chambers 130, 140.

Figure 3A:
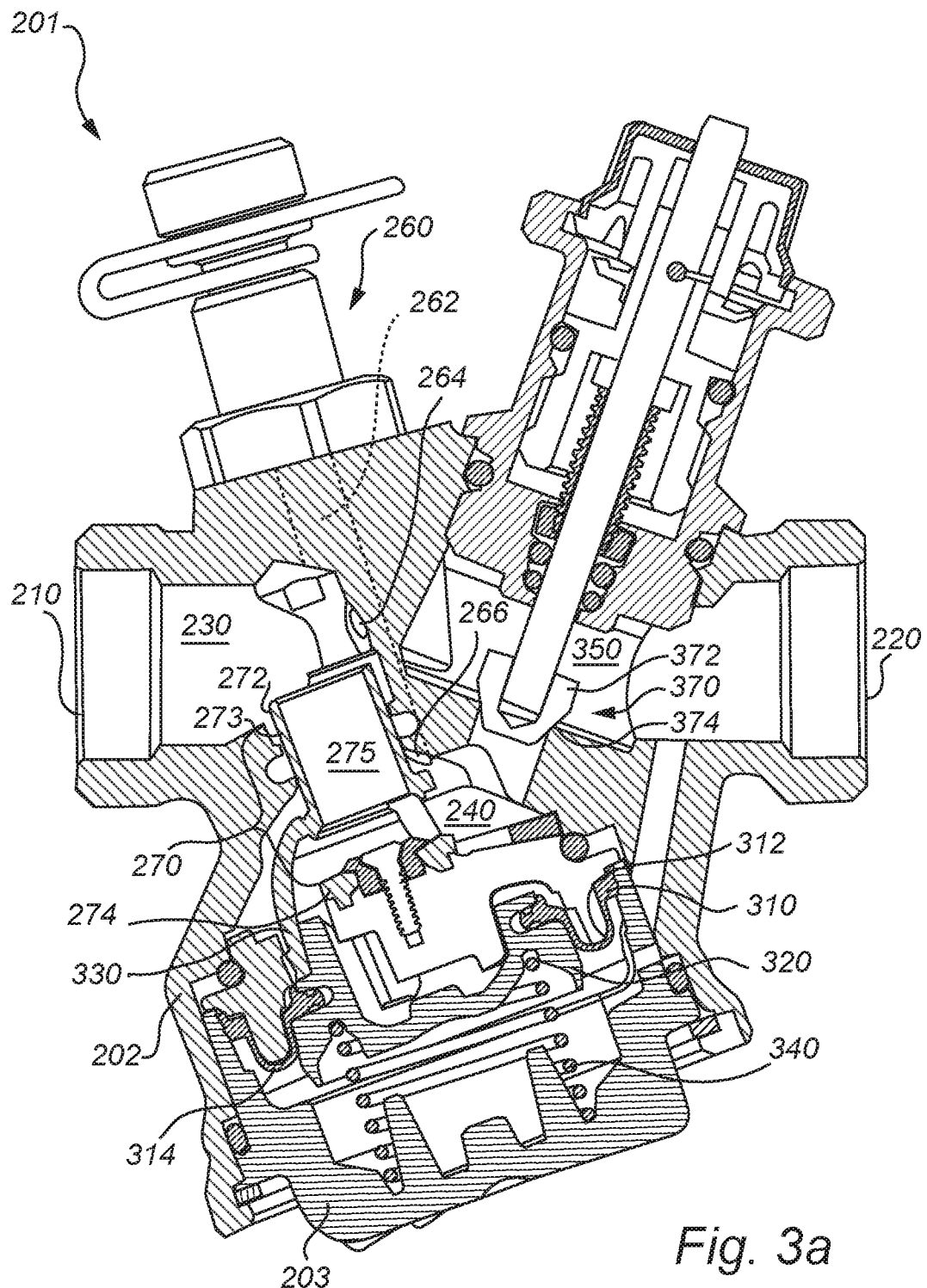
FIG. 3a illustrates in cross section a valve arrangement according to at least one example embodiment of the inventive concept.
Figure 3B:
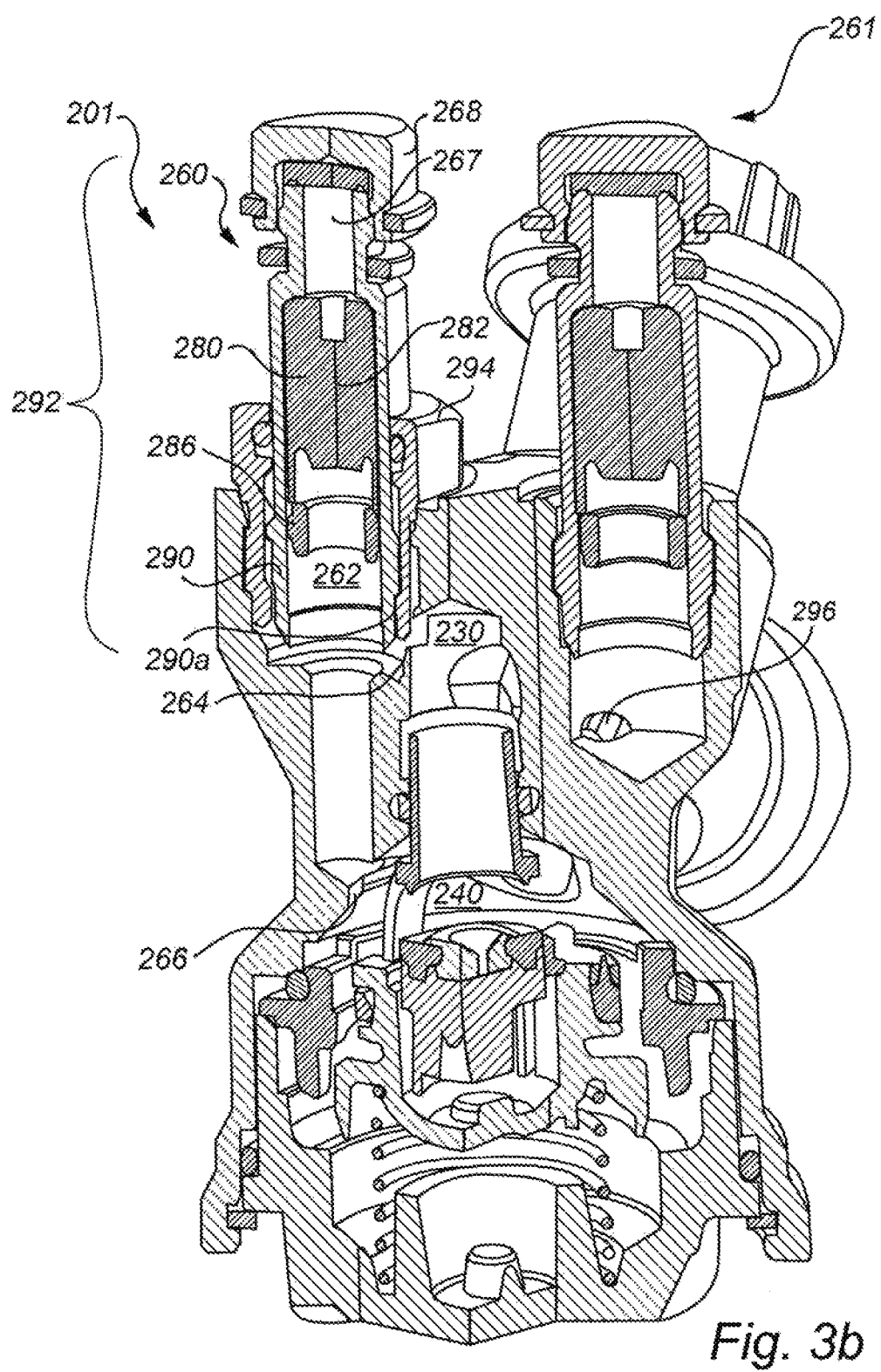
Figure 4:
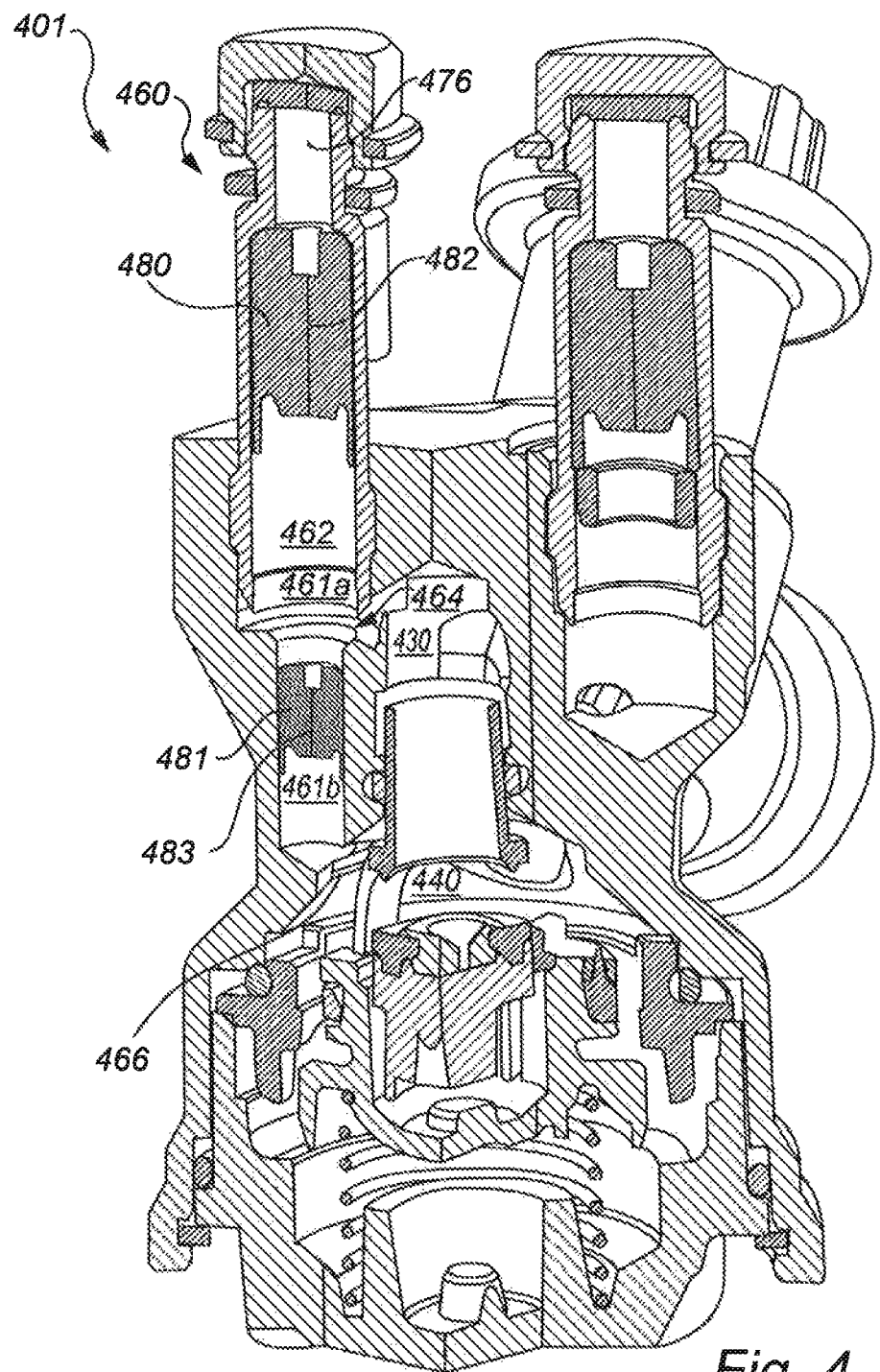
FIG. 4 illustrates in cross section a valve arrangement according to at least one example embodiment of the inventive concept.

If the closing arrangement 170 is in any of its open positions, and/or if there is a fluid flow through the valve arrangement 101, more varied ways to measure fluid pressure in the first chamber 130, fluid pressure in the second chamber 140, and/or a pressure difference between the first and second chambers 130, 140, are possible if at least one of the first and the second passages 164, 166 are closable and/or the first passage 164 is sealed from the second passage 166 by a sealing element (as shown in FIG. 4). Such alternatives will now be further described with reference to FIGS. 3a-b and FIG. 4.

FIG. 3a illustrates in cross section a valve arrangement 201 having a valve body 202. The valve arrangement comprises a valve inlet 210, a valve outlet 220 arranged downstream of the valve inlet 210, a first chamber 230 arranged directly downstream of the inlet 210, and a second chamber 240 arranged between the first chamber 230 and the valve outlet 220. The valve arrangement 201 further comprises a measuring nipple 260 having a measuring channel 262 for receiving a measuring device (not shown), such as e.g. a measuring probe, and a first closing arrangement 270 arranged between the first chamber 230 and the second chamber 240.

As illustrated in FIG. 3a, a first passage 264 is arranged between the first chamber 230 and the measuring channel 262, and a second passage 266 is arranged between the second chamber 240 and the measuring channel 262. The first passage 264 is in the form of an opening 264 between the first chamber 230 and the measuring channel 262. The second passage 266 is in the form of an opening 266 between the second chamber 240 and the measuring channel 262.

The first closing arrangement 270 in FIG. 3a comprises a first closing member 272 and a first seat 274, wherein in a closed position, the first closing member 272 seals the first chamber 230 from the second chamber 240 by sealing against the first seat 274. The first closing member 272 comprises a closing member body 273 having a through hole 275 for, in open positions of the first closing arrangement 270, allow for a fluid communication between the first chamber 230 and the second chamber 240.

An orifice is arranged between the first chamber 230 and the second chamber 240, wherein the orifice is providing for a fluid communication (e.g. a flow path, such as e.g. a main flow path) between the first chamber 230 and the second chamber 240. That is, the first seat 274 is comprised in the second chamber 240. The closing arrangement 270 is arranged to control fluid flow through the orifice such that when the closing arrangement 270 is in its open position, there is a fluid communication between the first chamber 230 and the second chamber 240 via the orifice. When the closing arrangement 270 is in its closed position, the fluid communication between the first chamber 230 and the second chamber 240 via the orifice is prevented. In other words, the closing arrangement 270 is arranged to seal the orifice when the closing arrangement 270 is in its closed position.

Thus, in this example embodiment the orifice is defined by an edge of the closing member body 273 surrounding the through-hole 275 and facing the second chamber 240.

As illustrated in FIG. 3a, the valve arrangement 201 comprises a membrane 310 and a membrane support 320 connected to, and movable with, the first closing member 272 of the first closing arrangement 270 via at least one connecting leg 330. Hereby, the first seat 274 is arranged between the membrane support 330 and the first closing member 272. The connecting leg 330 also provides for a space where fluid may flow from the through hole 275 of the first closing member 272 further into the second chamber 240 when the first closing arrangement 270 is in an open position.

The membrane has a first membrane side 312 and a second membrane side 314 arranged on an opposite side to the first membrane side 312. The first membrane side 312 is configured to be in fluid communication with fluid in the second chamber 240, for the fluid to apply a first pressure to the membrane 310, resulting in a first force which is the product of the first pressure and the area of the first membrane side 312 subjected to the first pressure. Similarly, the second membrane side 314 is configured to be in fluid communication with fluid in the valve outlet 220, for the fluid to apply a second pressure to the membrane 310, resulting in a second force which is the product of the second pressure and the area of the second membrane side 314 subjected to the second pressure. Thus, a difference between the first and second forces controls the movement of the membrane 310 and the membrane support 320 together with the first closing member 272 of the first closing arrangement 270.

As illustrated in FIG. 3a, a spring element 340 is arranged between a lid 203 arranged in the valve body 202 and the membrane support 320 for exerting a third force on at least a part of the membrane support 320. Thus, the direction of the third force is at least partly the same as the direction of the second force, i.e. acting to open the first closing arrangement 270.

In FIG. 3a, the valve arrangement 201 comprises a third chamber 350 arranged between the second chamber 240 and the valve outlet 220, directly upstream of the valve outlet 220. The third chamber 350 is separated from the second chamber 240 by a second closing arrangement 370 having a second closing member 372, here in the form of a plug 372, and a second seat 374. The second closing member 372 is configured to seal the second chamber 240 from the third chamber 350 by sealing against the second seat 374 in a closed position, and is arranged to allow for a fluid communication between the second chamber 240 and the third chamber 350 in open positions of the second closing arrangement 370.

FIG. 3b illustrates in cross section the same valve arrangement 201 as in FIG. 3a. Hence, the same reference numerals will be used for referring to the same features. Furthermore, in order to facilitate the reading comprehension, some reference numerals are only indicated in the FIG. 3a where first described.

As shown in FIG. 3b, two measuring nipples are arranged in the valve arrangement 201, the measuring nipple 260 as shown in FIG. 3a, hereafter described as the first measuring nipple 260, and a second measuring nipple 261 arranged to measure fluid pressure in the third chamber 350.

The first measuring nipple 260 comprises a sealing element 280 having a sealable through hole 282 for allowing a measuring device such as e.g. a measuring probe, to be guided through the through hole 282 into the measuring channel 262. The through hole 282 is configured to seal the measuring channel 262 from a top space 267 of the measuring nipple 260 when no measuring device is guided through the sealable through hole 282. The top space 267 is encapsulated by a cap 268 from an outside of the measuring nipple 260, i.e. the surroundings. If the cap 268 is removed, the top space 267 is in fluid communication with the surroundings.

Figure 5A:
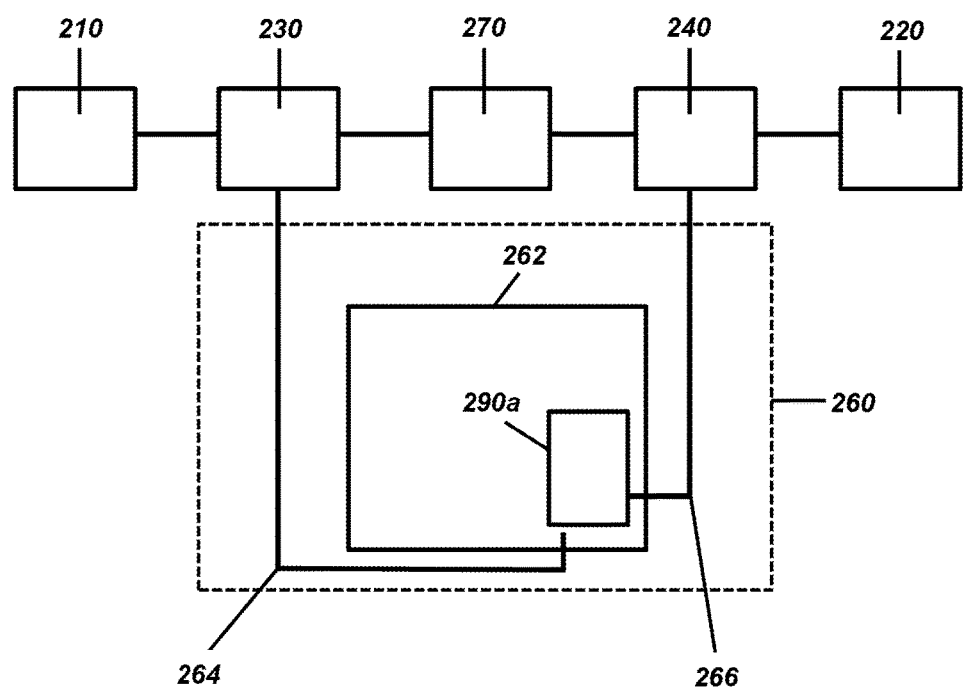
FIG. 5a is the schematic drawing showing an exemplary embodiment according to the disclosure.
Figure 5B:
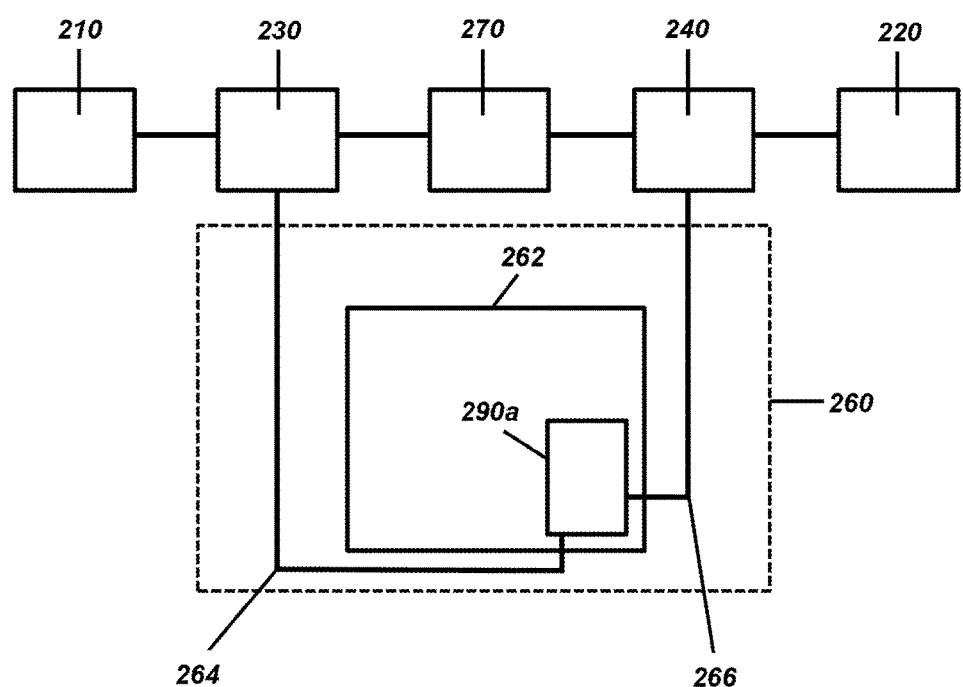
FIG. 5b is the schematic drawing showing an exemplary embodiment according to the disclosure.
Figure 5C:
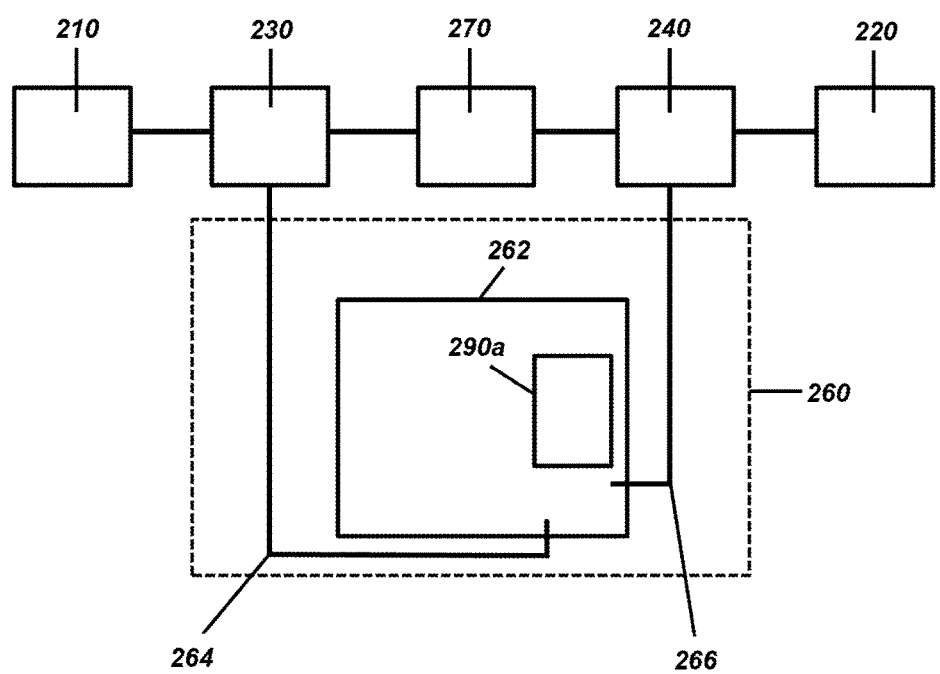
FIG. 5c is the schematic drawing showing an exemplary embodiment according to the disclosure.

On the opposite side of the sealing element 280, i.e. on an opposite side to the top space 267, a locking element 286 is arranged to lock the sealing element 280 in position within the first measuring nipple. The locking element 286, here shown as ring-shaped element 286, is optional and may be omitted. In FIG. 3b, a part of the measuring nipple body 290 functions as a movable occlusive element portion 290a and is configured to close and open the first passage 264. Even though the occlusive element 290 in FIG. 3b is configured to open and close the first passage 264, it may be configured to open and close the second passage 266, e.g. by being arranged within the measuring channel 262 and being formed as a plug or as a cone. See FIGS. 5a and 5b. The occlusive element 290 may also be configured to open and close both the first and the second passages 264, 266. See FIG. 5c.

In FIG. 3b, the movable occlusive element portion 290a is moved to and away from the first passage 264, i.e. moved up and down relative to the valve body 202, by letting a top part 292 of the measuring nipple 260 being screwed into and out of, the valve body 202 of the valve arrangement 201. For example, the cap 268 may be removed and a hex key inserted into the top space 267, acting as a socket. The walls surrounding the top space 267 may thus act as abutment against the hex key, and the top part 292 of the measuring nipple 260 may be screwed into the valve body 202 as the hex key is turned, whereby the movable occlusive element portion 290a may begin to close the first passage 264. The first passage 264 may then be opened by screwing the hex key in the opposite direction. Thus, by letting the movable occlusive element portion 290a be comprised in the measuring nipple body 290, and where a top part 292 of the measuring nipple 260 comprising the measuring nipple body 290, is movable relative to a valve body 202 of the valve arrangement 201, the first passage may be opened and closed upon moving screwing the top part of the measuring nipple 260 in or out of the valve body 202. Other means than screwing such as e.g. pushing and pulling, the top part 292 of the measuring nipple 260 into the valve body 202 is possible. The top part 292 of the measuring nipple 260 may be threaded on its outside, while the aperture in the valve body where the top part 292 of the measuring nipple 260 is inserted, comprises corresponding threads. According to at least one example embodiment, a nut 294 may be arranged around at least a part of the top part 292 of the measuring nipple 260 to seal the measuring channel 262 from the surroundings. The nut 294 may also have corresponding threads to the top part 292 of the measuring nipple 260.

Similar to the first measuring nipple 260, the second measuring nipple 261 comprises a sealing element, a locking element for locking the sealing element in position, and a third passage 296 into the third chamber 350. By having a second measuring nipple 261 arranged to measure e.g. fluid pressure in the third chamber 350, the two measuring nipples 260, 261 may be used to measure a differential pressure between the first chamber 230 and the third chamber 350, and/or between the second chamber 240 and the third chamber 350.

A correctly installed valve arrangement 201 is normally comprised in a fluid distribution system where a first fluid conduit is arranged to guide fluid to the valve inlet 210, and a second fluid conduit is arranged to guide fluid away from the valve outlet 220. When the first closing arrangement 270 is open to allow for a fluid communication between the first and second chambers 230, 240, and the second closing arrangement 370 is open to allow for a fluid communication between the second chamber 240 and the third chamber 350, and there is a fluid flow through the valve arrangement 201 (i.e. the fluid flow is not restricted at, or downstream of, the valve outlet 220) a fluid pressure in the first chamber 230 is higher than a fluid pressure in the second chamber 240, and a fluid pressure in the second chamber 240 is higher than a fluid pressure in the third chamber 350.

When the valve arrangement 201 is correctly installed in a fluid distribution system, the first closing arrangement 270 functions as a differential pressure valve part, and the second closing arrangement 370 functions as a control valve part. Thus, the differential pressure valve part may limit the differential pressure to which the control valve part is exposed. Therefore, the operating conditions for the control valve part may be maintained at an adequate level despite variations of the pressure level in the entire fluid distribution system.

As illustrated in FIG. 3b, the movable occlusive element portion 290a is arranged not to close the second passage 266, i.e. not to prevent the pressurized communication with the second chamber 240, i.e. to allow for an uninterrupted pressurized communication between the second chamber 240 and the measuring channel 262. Thus, the movable occlusive element portion 290a is a part of the measuring nipple body 290, or the surrounding walls 290 of the measuring channel 262. According to at least one example embodiment, the first passage 264 between the measuring channel 262 and the first chamber 230 may be closed or open depending on the position of the movable occlusive element portion 290a. For example, if the movable occlusive element portion 290a is arranged such that the outside of the movable occlusive element portion 290a fully covers the first passage, the first passage is closed. Thus, a measuring device may be used to e.g. measure fluid pressure in the second chamber 240 via the measuring channel 262. The first passage 264 may then be opened by moving the movable occlusive element portion 290a away from the first passage 264.

When the first closing arrangement 270 is in its closed position, and the first and the second passages 264, 266 of the first measuring nipple 260 is in fluid communication with each other via the measuring channel 262, i.e. the first and second passages 264, 266 are opened, a fluid by-pass of the first closing arrangement 270 is provided for. If the fluid at, or downstream of, the valve outlet 220 is restricted by e.g. the second closing arrangement 370 being closed (such that no fluid is allowed to flow through the valve arrangement 201), fluid pressure in the first chamber 230 and fluid pressure in the second chamber 240 will be essentially the same, or the same, as the fluid by-pass provides for a pressurized communication between the first and the second chambers 230, 240. Hereby, fluid pressure in the first chamber 230, which comprises the available pressure from the nearest upstream pressure source, may be measured in the measuring channel 262 by a measuring device, e.g. by measuring the differential pressure between the first and the second measuring nipple.

When the first closing arrangement 270 is in an open position, and the first passage 264 of the first measuring nipple 260 is closed, and the second passage 266 is in fluid communication with the measuring channel 262, i.e. the second passages 266 is opened, fluid pressure in the second chamber 240 may be measured in the measuring channel 262 by a measuring device. This pressure together with a measurement of the fluid pressure in the third chamber 350, may be used to control the first closing arrangement 370.

FIG. 4 illustrates in cross section a valve arrangement 401 similar to that in FIGS. 3a-b, with the difference that the locking element 286, and the movable occlusive element 290 are removed and that two sealing elements 480, 481 is arranged in the first measuring nipple 460. Hence, some functions/components will not be described again with reference to FIG. 4.

The first sealing element 480 is similar to the sealing element 480 of that in FIG. 3b, and the second sealing element 481 is arranged closer to the second chamber, between the first and the second passages 464, 466. The first and the second sealing elements 480, 481 are arranged to separate the measuring channel 460 into a first measuring channel portion 461a and a second measuring channel portion 461b. That is, the first and the second measuring channel portions 461a, 461b together form a part of the measuring channel 460. The first measuring channel portion 461a is sealed from a top space 476 of the measuring nipple 460 by the first sealing element 480, and is sealed from the second measuring channel portion 461b by the second sealing element 481. Hence, the second sealing element 481 is arranged inside the measuring channel 460 between the first and the second passages 464, 466. Hereby, the first measuring channel portion 461a is arranged in pressurized communication with the first passage 464 and the first chamber 430, and the second measuring channel portion 461b is arranged in pressurized communication with the second passage 466 and the second chamber 440.

As shown in FIG. 4, each of the first and second sealing element 480, 481 comprises a sealable through hole 482, 483 for allowing a measuring device, such as e.g. a measuring probe, to be guided through the through holes 482, 483 into the first and second measuring channel portion 461a, 461b, respectively. The sealable through holes 482 of the first sealing element 480 is configured to seal the top space 476 of the measuring nipple 460 from the first measuring channel portion 461b, and the sealable through holes 483 of the second sealing element 481 is configured to seal the first measuring channel portion 461a from the second measuring channel portion 461b, when no measuring device is guided through any one of the sealable throughholes 482, 483.

Hereby, a measuring device, such as a measuring probe, may be inserted into the first measuring channel portion 461a by penetrating the through hole 482 of the first sealing member 480. Thus, fluid characteristics such as fluid pressure, of fluid inside the first chamber 430 may be measured as the first measuring channel portion 461a is in pressurized communication and/or fluid communication with the first chamber 430 via the first passage 464. If the measuring probe is further guided through the measuring channel 460 and is allowed to penetrate the through hole 483 of the second sealing member 480 and further into the second measuring channel portion 461b, fluid characteristics such as e.g. fluid pressure of fluid inside the second chamber 440 may be measure as the second measuring channel portion 461b is in pressurized communication and/or fluid communication with the second chamber 440 via the second passage 466. Thus, the sealing elements 480, 481 need not to be movable within the measuring channel 462 as the sealable through holes 482, 483 provide for the possibility of the measuring device to be in fluid communication and/or a pressurized communication with each chamber 430, 440 separately.

For example, if the first and the second closing arrangements are opened, the pressure difference between fluid pressure in the first chamber 430 and the second chamber 440 may be measured during fluid flow through the valve arrangement 401.

While the valve arrangements and the fluid distribution system where the valve arrangement is to installed, are illustrated as having a particular configuration, one skilled on the art will recognize that valve arrangements and fluid distribution systems may include more or fewer components of different types. Indeed, one skilled in the art will recognize that the valve arrangements illustrated in FIGS. 1-4, have been constructed to illustrate various aspects of the present inventive concept, and therefore are presented by way of illustration and not by way of limitation. For example the present inventive concept is not limited to the specific arrangement of the closing arrangements or the numbers of closing arrangements and chambers as shown here, but there may be fewer or more (intermediate) chambers and fewer or more closing arrangements of (possibly) different types within the valve arrangement. Furthermore, there may be more measuring nipples connected to theses chambers for measuring of fluid properties such as e.g. fluid pressure.

The invention claimed is:

1. A valve arrangement comprising:
a valve inlet,
a valve outlet arranged downstream of said valve inlet,
a first chamber arranged directly downstream of said valve inlet, and a second chamber arranged between said first chamber and said valve outlet,
a measuring nipple comprising a measuring channel for receiving a measuring device,
a closing arrangement having open positions and a closed position, wherein said closing arrangement in its closed position is configured to prevent fluid communication between said first chamber and said second chamber via said closing arrangement, and wherein said closing arrangement in its open positions is configured to allow for fluid communication between said first chamber and said second chamber via said closing arrangement,
a first passage arranged between said first chamber and said measuring channel without passing said second chamber, said first passage enabling measuring of fluid pressure in said first chamber, and
a second passage arranged between said second chamber and said measuring channel without passing said first chamber, said second passage enabling measuring of fluid pressure in said second chamber, wherein
said measuring nipple comprises a movable occlusive element portion, said movable occlusive element portion being configured to close and open at least one of said first and second passages between said first chamber and said measuring channel, and between said second chamber and said measuring channel, respectively by linear movement within the measuring channel.

2. A valve arrangement according to claim 1, wherein said measuring nipple comprises a sealing element, said sealing element having a sealable through hole for allowing a measuring device to be guided through said through hole into said measuring channel, and wherein said sealable through hole is configured to seal said measuring channel when no measuring device is guided through said sealable through-hole.

3. A valve arrangement according to claim 1, wherein said closing arrangement comprises a closing member and a seat, and wherein, in said closed position, said closing member seals against said seat.

4. A valve arrangement according to claim 3, wherein said closing member comprises a closing member body having a through hole for, in said open positions, allow for fluid communication between said first chamber to said second chamber.

5. A valve arrangement according to claim 3, comprising a membrane and a membrane support connected to, and movable with said closing arrangement, said membrane having a first membrane side and a second membrane side arranged on an opposite side to said first membrane side,
- said first membrane side being configured to be in fluid communication with said second chamber for applying a first pressure to said membrane, resulting in a first force which is the product of the first pressure and the area of the first membrane side subjected to said first pressure,
- said second membrane side being configured to be in fluid communication with said outlet for applying a second pressure to said membrane, resulting in a second force which is the product of the second pressure and the area of the second membrane side subjected to said second pressure,
- wherein a difference between said first and second forces controls the movement of said membrane and said membrane support together with said closing arrangement.

6. A valve arrangement according to claim 5, comprising a spring element arranged to exert a third force on at least a part of said membrane support, wherein a direction of said third force is at least partly the same as a direction of said second force.

7. A valve arrangement according to claim 5, wherein said closing member is connected to said membrane support by means of at least one connecting element, and wherein said seat is arranged between the membrane support and said closing member.

8. A valve arrangement according to claim 5, wherein said closing arrangement is a first closing arrangement, said seat is a first seat, and said closing member is a first closing member, and wherein said valve arrangement further comprises:
- a third chamber arranged between said second chamber and said valve outlet, said third chamber being arranged directly upstream of said valve outlet,
- a second closing arrangement having a second seat and a second closing member, said second closing member being configured to prevent fluid communication between said second chamber and said third chamber via said second closing arrangement by sealing against said second seat in a closed position, and being arranged to allow for a fluid communication between said second and said third chamber in open positions via said second closing arrangement.

9. A valve arrangement according to claim 8, wherein said third chamber is in pressurized communication with said second side of said membrane.

10. A valve arrangement according to claim 8, wherein said first closing arrangement is a differential pressure valve part, and said second closing arrangement is a control valve part.

11. A fluid distribution system comprising a valve arrangement according to claim 8, a first fluid conduit for guiding fluid to said valve inlet, and a second fluid conduit for guiding fluid away from said valve outlet, wherein when said first closing arrangement is open to allow for a fluid communication between said first and second chamber, and said second closing arrangement is open to allow for a fluid communication between said second chamber and said third chamber, a fluid pressure in said first chamber is higher than a fluid pressure in said second chamber, and a fluid pressure in said second chamber is higher than a fluid pressure in said third chamber.

12. A valve arrangement according to claim 1, comprising an orifice arranged between said first chamber and said second chamber, wherein said orifice is providing for a fluid communication between said first chamber and said second chamber, and wherein said closing arrangement is arranged to control fluid flow through said orifice such that when the closing arrangement is in its open position, there is a fluid communication between the first chamber and the second chamber via said orifice, and when the closing arrangement is in its closed position, the fluid communication between the first chamber and the second chamber via said orifice is prevented.

* * * * *